Patented May 28, 1935

2,002,589

UNITED STATES PATENT OFFICE 2,002,589

FRUIT TREATING COMPOSITION AND PROCESS OF TREATING FRUIT

Jagan N. Sharma, Berkeley, Calif., assignor to Food Machinery Corporation, San Jose, Calif., a corporation of Delaware No Drawing. Application October 12, 1932, Serial No. 637,549

8 Claims. (Cl. 99—8)

This invention relates to the art of treating fruit for inhibiting decay, and is of particular value in the treatment and handling of citrus fruits to prevent decay from blue and green mold spores.

Heretofore, various expedients have been suggested and adopted for the treatment of fruits, such as citrus fruit, to prevent decay from mold spores, such as blue and green mold spores. The most successful of such expedients comprises the washing of the fruit in an aqueous solution of mold retarding agents, such as sodium hypochlorite and hypochlorous acid.

Solutions of borax have also been used to a considerable extent. Such treatments, especially the hypochlorous acid treatment, have been shown to substantially sterilize the fruit from mold spores, so that if the fruit is thereafter hermetically sealed from fresh infection it can be preserved almost indefinitely without the development of any mold decay. In practice, however, the fruit is dried after the disinfesting treatment and then, with or without a waxing treatment to restore the fresh and polished appearance of the fruit, wrapped and packed for shipment.

There is much opportunity after the disinfecting of the fruit for it to be re-infected with mold spores. Attempts to leave upon the fruit quantities of mold inhibiting agents in order to continue their effect of sterilizing the fruit during its transit to the market have not proven effective. The compounds used in the treating baths for disinfecting the fruit are either unstable, such as is the case with sodium hypochlorite and hypochlorous acid, or when dried solid materials are used which go into solution in water slowly, have no mold inhibiting effects in the solid state. Moreover, the solid crystalline materials when left upon the fruit give a noticeable white deposit, and in practical operation this noticeable deposit must be removed and all but a trace thereof is removed by rinshing. The practical result is, as in practice it has been proven, that the treated fruit by the methods now in use is subject to a fresh inoculation with mold spores and will, and does, in many cases decay after the mold inhibiting treatments due to these fresh inoculations.

It is the general object of the present invention to provide a composition for treating fruit and a process of mold treating and handling fruit preparatory to its transit to the market by which the fruit may be more adequately protected against decay from mold spores, particularly blue and green mold spores in the case of citrus fruit, than has been possible with heretofore known or used compositions or processes of treatment.

More particularly, the present invention comprises the discovery that certain compounds, generally classified as chloramines, may be added to covering materials applied to fruits in transit to the market and protect the fruit against mold decay. Results may be obtained by applying these compounds, admixed with what may be called a carrier or a spreading material, such as waxy materials, either to the surface of the fruit, as is the usual manner of waxing fruit, or by applying a mixture of the carrying wax and chloramine to even the paper in which the individual fruit is wrapped. Chloramines, in general, are stable compounds of chlorine in the dry state, but upon absorption of moisture they decompose, liberating chlorine, and this chlorine, as it is decomposed, is the active agent in disinfecting the fruit from mold spore decay. It is particularly effective when the chloramine is applied in a covering directly to the skin of the citrus fruit, because there the chlorine, as it is liberated in the nascent state, comes most directly in contact with the skin of the fruit. The property of this class of ingredients in liberating chlorine only when wet or upon absorption of moisture is of special value, because the active effect of the material is expended only as needed in the disinfecting of the fruit. During the life of the fruit, after it has been picked, it in practice does what is called breathe, i. e. gives off moisture or sweats slightly, and this moisture exuded from the fruit itself slightly decomposes the chloramine, and thus the chlorine for disinfecting purposes is supplied in a nascent state at about the rate necessary to preserve the fruit.

The class of chemicals included under the designation chloramines includes, of course, a large body of materials, all of which apparently are effective in the treatment of citrus fruit, but some thereof, due to different individual properties, are less suited than others. The gaseous chloramines, such as ammonium monochloramine and ammonium dichloramine, can not be absorbed in material quantities in waxy materials and so their use is of limited value. Other chloramines, which are liquids, can only be used in minor quantities, because if used in large quantities they reduce the melting point of the waxy composition applied to the fruit below desired limits. Thus, for example, benzol chloramine can only be used in rather minor quantities. Toluene chloramine, however, is of higher melting point and may be used with increased effectiveness. I have found, however, that the sulphon chloramines are of special value in the treatment, such as the para and orthotoluene sulphon chloramines, both the mono and dichloramines and also the sulphon sodium chloramines. The benzol sulphon chloramine is also satisfactory.

Of the compounds mentioned, the one most readily obtained on the market and possessing a melting point most suitable for the composition and product of this invention is the para toluene sulphon dichloramine, having the formula $CH_3.C_6H_4.SO_2.NCl_2$. In the sulphon chloramines the chlorine seems to be held to the compound with the degree of stability best suited for the composition and process of this invention, the chlorine being somewhat more easily liberated by the mixture given off through breathing of the fruit than is the case with certain other chloramines.

The compound of the present invention may be applied as by itself in the treatment of fruit or in combination with or as an accessory to various other methods of treating fruit. The present invention will best be understood from a preferred example of a process and composition for treating fruit embodying the invention. For this purpose, I have hereinafter described a preferred form, or example, of the invention. I prefer, for example, in the treating of citrus fruit, such as oranges, to first wash the fruit and treat the same with aqueous solutions of mold retarding agents in any usual or preferred manner. The most effective of such manners known to me is the treatment of fruit with solutions of hypochlorous acid. After washing and disinfecting the fruit with these solutions of hypochlorous acid, the hypochlorite is washed from the fruit by rinsing, in order to inhibit any destruction of brushes and the remainder of the apparatus by the somewhat corrosive treating solution, and the fruit is then dried.

There is then applied to the washed and dried fruit in any suitable or preferred manner a composition consisting of the following materials. I prefer to employ as the base, or carrier, or spreader, a waxy material, of which paraffine wax is the most simple example, the paraffine wax having a melting point of about 132° F. being an example of the preferred wax. This wax is melted in order to prepare the treating composition, and there is then added a quantity of the chloramine, after which the material is preferably permitted to again cool and solidify. The quantity of the chloramine will, of course, vary with the individual chloramines employed and also with the extent of protection desired. I have found, for example, that in the case of toluene sulphon dichloramine the addition of 2% of this material to the wax will produce satisfactory results in actual operations, although in certain cases it may be desirable to use lower percentages or higher percentages. I have, in some cases, used as high as 4%. The composition thus resulting has about the same melting point as the original wax, i. e. about 132° F., and is a most suitable composition for protecting the fruit from mold decay during its transit to the market.

While various methods of applying the composition to the skin of the fruit may be used, I prefer to employ the method of brushing the composition on the fruit by passing the fruit over brushes which on one side engage the fruit and on the other side engage a solid bar or slab of the composition. In this manner, the same brushing apparatus may not only distribute the composition on the fruit, but also operate to effect a polishing of the fruit.

In practical operation, fruit so treated with the chloramine composition is found to be protected against fresh inoculations from mold spores and to arrive at the markets substantially devoid of mold decay. A partially effective use of the composition may be attained by applying the composition to wrapping paper in which the individual fruit is wrapped in place of applying the composition directly to the fruit surface itself, or as an additional precaution against mold decay.

There is a large number of chloramines suitable in the present process or composition. Among these are:

Para toluene sulphon dichloramine
Ortho toluene sulphon dichloramine
Benzene sulphon chloramine
Para ethyl benzene sulphon chloramine
Para chlorbenzene sulphon chloramine
Ortho, Meta, Para xylene sulphon chloramine
Mesitylene sulphon chloramine
Benzyl sulphon chloramine
L. & B. napthalene sulphon chloramine
Quinone chloramine
Quinone dichloramine
Acetyl chloramino benzene
Acetyl chloramino chlorxylene There are, of course, others which are without doubt suitable, in view of the suitability of the above-mentioned compounds.

While the particular form or example of the product and processes embodying the present invention herein described is well adapted to carry out the objects of the invention, various modifications and changes may be made, all of which come within the scope of the appended claims.

I claim:

1. A composition for treating fruit to retard decay from mold spores, which composition comprises a waxy coating material having dissolved therein a chloramine which is stable in solution in said wax but is capable when the coating of the composition is applied to the fruit of liberating chlorine as the composition receives moisture.

2. A composition for retarding decay of fruit from mold spores, which comprises a coating material of plastic waxy nature having dissolved therein a sulphon chloramine, the latter being substantially stable except as it receives moisture, the composition having the property of gradually liberating chlorine when applied as a coating to fruit as moisture is received by the coating.

3. A composition for retarding the decay of fruit from mold spores, which composition includes a coating material of plastic waxy nature having dissolved therein toluene sulphon chloramine, the composition having the property of gradually liberating chlorine when applied as a coating on fruit, the liberation of chlorine being proportional to the moisture received by the coating.

4. A process of treating fruit to retard decay from mold spores, which process comprises applying to the fruit a composition including a plastic waxy material having dissolved therein a chloramine, whereby the composition retains its chlorine content except as the compound is decomposed due to the liberation of chlorine as moisture is received by the coating.

5. A process of treating fruit to retard decay from mold spores, which process comprises applying to the dried surface of fresh fruit a thin covering of a composition including a wax and a sulphon chloramine soluble in the wax and substantially stable against the liberation of chlorine when in the dried state, the sulphon chloramine having the property in the coating of gradually liberating chlorine as the coating receives moisture.

6. A process of treating fruit to retard the decay of the fruit from mold spores, which process comprises applying to a dried surface of fresh fruit a coating including a wax-like material having dissolved therein toluene sulphon chloramine in such form that the chloramine is stable against liberation of chlorine except as the coating receives moisture.

7. A process of treating citrus fruit to retard the decay of the fruit from mold spores, which process comprises first treating the fruit to disinfect the fruit from mold spores by passing the fruit through an aqueous solution of a mold retarding agent, thereafter drying the surface of the fruit, and spreading on the fruit a coating of a composition including a wax-like material and toluene sulphon chloramine dissolved therein in a state stable against the liberation of chlorine while dry but capable of gradual liberation of chlorine as moisture is received by such coating.

8. A process of treating citrus fruit to retard the decay of the fruit from mold spores, which process comprises applying to a dried surface of the fresh fruit a coating containing in solution a chloramine capable of liberating a gaseous mold retarding agent in the wet state but stable against liberation of said agent in the dried state, whereby the effective strength of such coating is utilized only as moisture is received by the coating.

JAGAN N. SHARMA.